United States Patent
Lai (10) Patent No.: US 7,782,343 B2
(45) Date of Patent: Aug. 24, 2010

(54) SCALING DEVICE OF IMAGE PROCESS

(75) Inventor: Hung-Chih Lai, Hsinchu (TW)

(73) Assignee: Etron Technology Inc., Hsinchu (TW)

( * ) Notice: Subject to any disclaimer, the term of this patent is extended or adjusted under 35 U.S.C. 154(b) by 1177 days.

(21) Appl. No.: 11/396,694

(22) Filed: Apr. 4, 2006

(65) Prior Publication Data

US 2007/0110337 A1 May 17, 2007

(30) Foreign Application Priority Data

Nov. 14, 2005 (TW) .............................. 94139915 A (51) Int. Cl.
*G09G 5/02* (2006.01)
(52) U.S. Cl. .................... 345/660; 382/298; 358/1.2; 348/240.2
(58) Field of Classification Search ................ 345/668, 345/669
See application file for complete search history.

(56) References Cited

U.S. PATENT DOCUMENTS

| | | | | | |
|---|---|---|---|---|---|
| 4,703,353 | A | * | 10/1987 | David | 348/441 |
| 4,988,984 | A | * | 1/1991 | Gonzalez-Lopez | 345/660 |
| 5,335,295 | A | * | 8/1994 | Ferracini et al. | 382/298 |
| 2004/0218835 | A1* | | 11/2004 | Loew | 382/299 |

* cited by examiner

*Primary Examiner*—Ulka Chauhan
*Assistant Examiner*—Robert Bader
(74) *Attorney, Agent, or Firm*—Muncy, Geissler, Olds & Lowe, PLLC (57) ABSTRACT

A scaling device for an image processor includes an image enlarging device and an integer divider. The image enlarging device receives an input image data, and enlarges the input image data, outputting an enlarging image data and a sample signal. The integer divider receives the enlarging image data, and samples the enlarging image data, outputting an object image data. By only adding an external integer divider at the output of the image enlarging device for obtain the scaling function of the image processor, a simpler circuit for image scaling is presented.

7 Claims, 8 Drawing Sheets

SCALING DEVICE OF IMAGE PROCESS

FIELD OF THE INVENTION

The present invention relates to a scaling device for an image processor, where by only adding an external integer divider at the output out of the image enlarging device to obtain the scaling function of image process, a simpler circuit for image scaling is presented.

BACKGROUND OF THE INVENTION

Recently, various electrical products with a display function are increasing in the market. The image transmitting and receiving between each electrical product should be processed by an image processor for showing on the display panel of electrical products. However, the image size and resolution of every electrical product are different, therefore, the scaling device for image scaling has become important.

Figure 1:
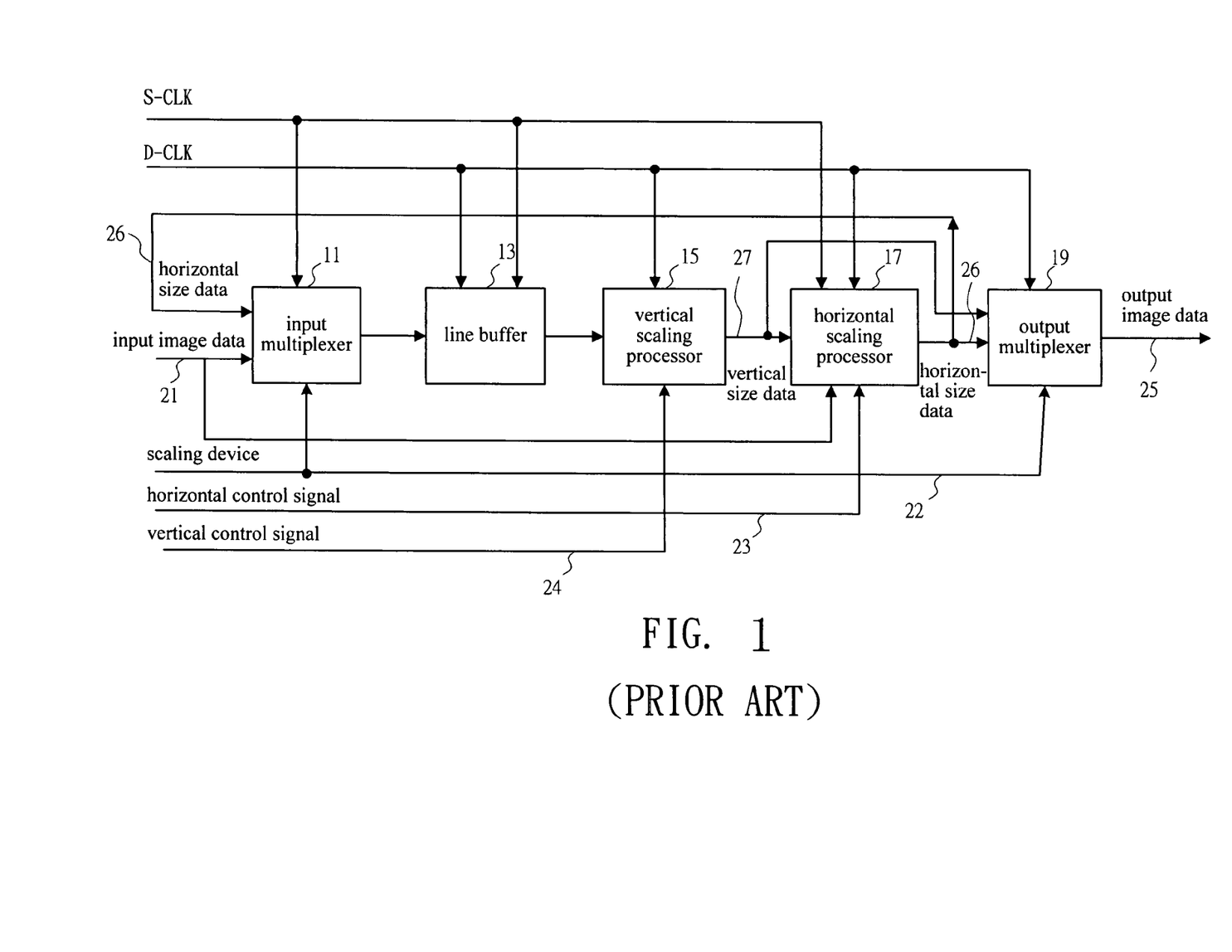
FIG. 1 is a block circuit diagram of a prior art image scaling device.

FIG. 1 shows an image scaling device of the prior art. The device comprises an input multiplexer 11, a line buffer 13, a vertical scaling processor 15, a horizontal scaling processor 17, and an output multiplexer 19. The input multiplexer 11 receives input image data 21 or horizontal size data 26 according to the corresponding scaling signal 22. When the scaling signal 22 is an enlarging signal, it receives the input image data 21; when the scaling signal 22 is a reducing signal, it receives the horizontal size data 26, and the clock is the input clock S_CLK.

Line buffer 13 is used for transferring the input image data 21 from the input multiplexer 11 at the accessing frequency of horizontal size data 26. Further, the clock of the input end of the line buffer 13 is S_CLK, and the clock of the output end thereof is D_CLK. The vertical scaling processor 15 processes the vertical image scaling for the input image data 21 from line buffer 13 or the horizontal size signal 26 according to the corresponding vertical control signal 24 of the scaling signal 22, and outputs a vertical size data 27. The clock is the output clock D_CLK.

Horizontal scaling processor 17 processes the horizontal image scaling for the input image data 21 or vertical size data 27 according to the corresponding horizontal control signal 23 of the scaling signal 22. The horizontal scaling processor 17 comprises two clocks, one of two clocks being selected depending on the scaling signal 22 for operation. When the scaling signal 22 is the enlarging signal, the clock of horizontal scaling processor 17 is D_CLK. When the scaling signal 22 is the reducing signal, the clock of horizontal scaling processor is S_CLK. The output multiplexer 19 outputs an output image data according to the corresponding scaling signal 22, and the clock is output clock D_CLK.

In accordance with the above prior art, integrating the circuits of image enlarging and reducing into a single circuit is too complicated and difficult, especially with the horizontal scaling processor 17 comprising two clocks. When the horizontal image is scaled, the clock control is more difficult for circuit design.

Figure 2:
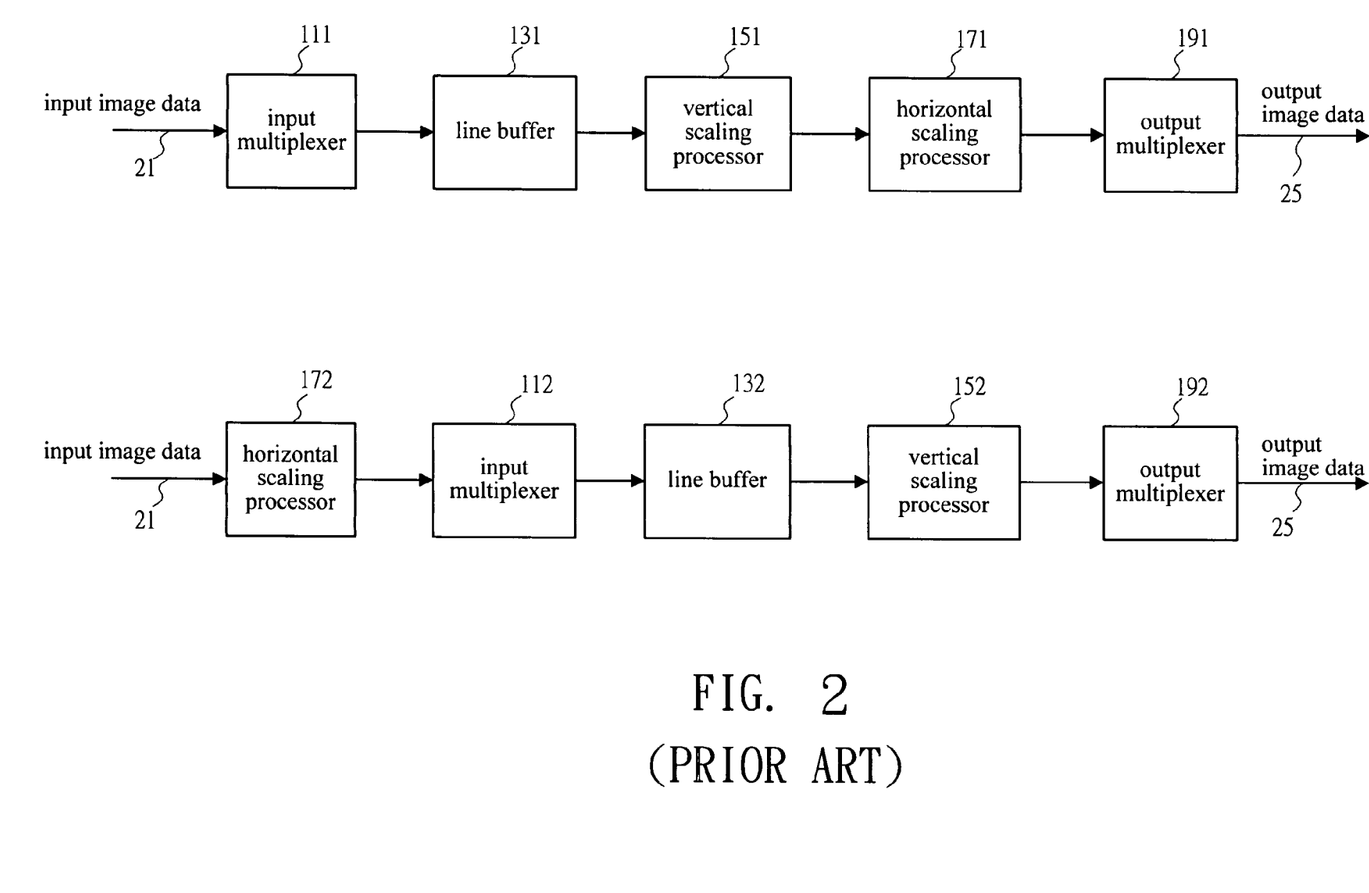
FIG. 2 is a divider circuit diagram of the prior art image scaling device.

Partial manufacture divides the circuits of image enlarging and reducing into two parts in order to reduce the complication of circuit design as shown in FIG. 2. The upper part is the image data enlarging circuit of the image scaling device, comprising an input multiplexer 111, a line buffer 131, a vertical scaling processor 151, a horizontal scaling processor 171, and an output multiplexer 191. The lower part is the image reducing circuit of the image scaling device, comprising a horizontal scaling processor 172, an input multiplexer 112, a line buffer 132, vertical scaling processor 152, and an output multiplexer 192. This method processes the image enlarging and reducing by two independent circuits, which reduces the difficulty of circuit design, but the redundancy of elements is increased and is around double the number of circuits shown in FIG. 1, so that the cost of hardware is higher.

SUMMARY OF THE INVENTION

Accordingly, to design a simple and lower cost scaling device with respect to the previous mentioned shortcomings of the prior art without higher hardware cost and circuit complication is the key point of the present invention.

It is a primary object of the present invention to provide a scaling device for an image processor for implementing the image scaling function by a simpler circuit, and saving the cost of hardware.

It is a secondary object of the present invention to provide a scaling device of an imageprocessor, comprising an image enlarging device coordinating an integer divider to achieve the function of image enlarging and reducing.

It is another object of the present invention to provide a scaling device of an imageprocessor so that when the scaling signal is pointed for reducing, the scaling device goes to enlarge the image at first, and then reduces the image, thus increasing the sampling of image information by scaling device, and reducing the distortion rate of the image definition.

To achieve the previous mentioned objects, the present invention provides a scaling device for imageprocessor, comprising an image enlarging device for receiving an input image data and scaling signal, and enlarging the input image data depending on the scaling signal to output an enlarging image data and a sample signal; and an integer divider connected to the image enlarging device for receiving the enlarging image data and sampling the enlarging image data depending on the sample signal to output an object image data.

DETAILED DESCRIPTION OF THE INVENTION

The structural features and the effects to be achieved may further be understood and appreciated by reference to the presently preferred embodiments together with the detailed description.

Figure 3:
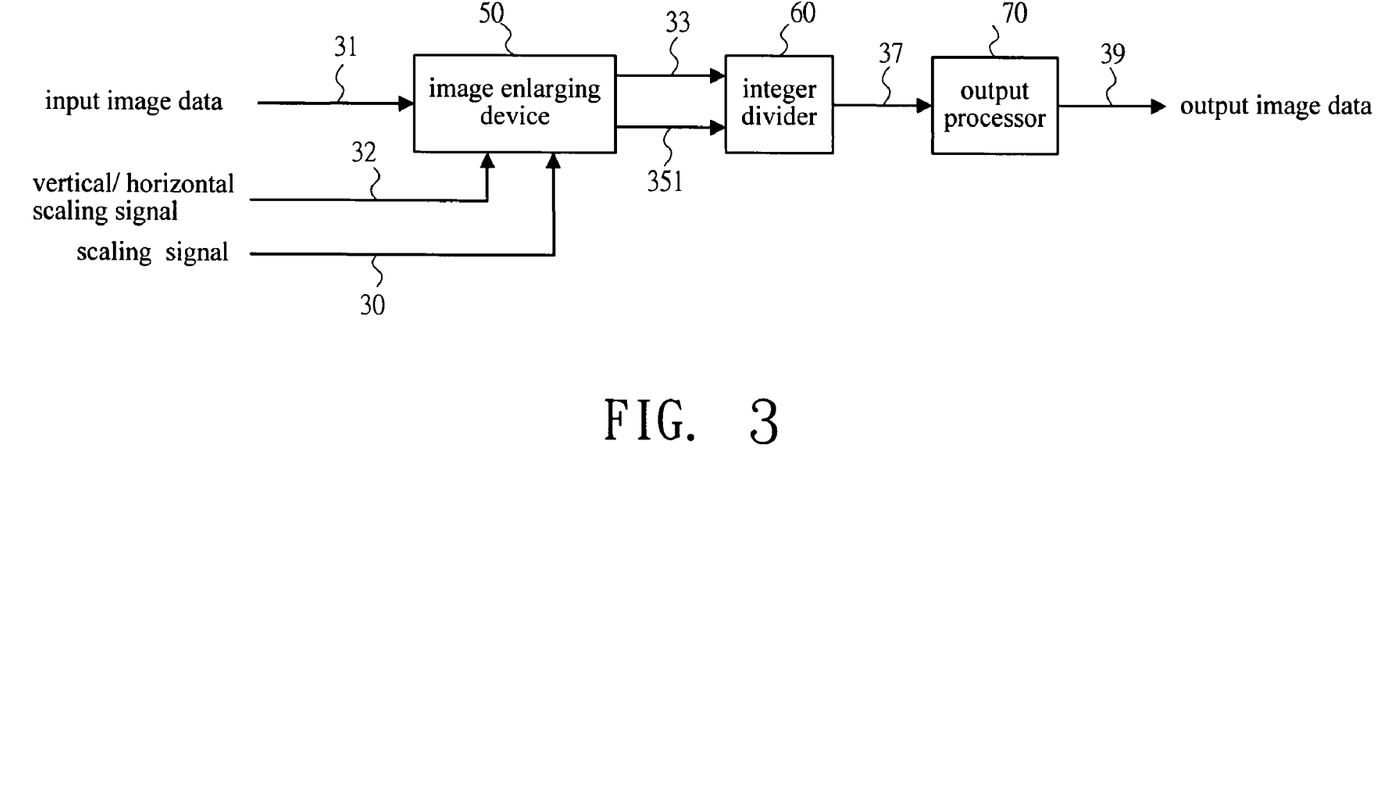
FIG. 3 is a block diagram of the scaling device of an image processor of a preferred embodiment of the present invention.

Firstly, FIG. 3 is a block diagram of the scaling device of an image processor of a preferred embodiment of the present invention. The scaling device of the image processor of the present invention is used for scaling the input image data 31, comprising an image enlarging device 50, an integer divider 60, and an output processor 70.

The image enlarging device 50 is used for receiving an input image data 31, and enlarging the input image data 31 depending on a scaling signal 30 to output an enlarging image data 33 and a sample signal 351. The integer divider 60 is used for receiving the enlarging image data 33 and the sample signal 351, and sampling the enlarging image data 33 depending on the sample signal 351 to obtain the object image data 37. The input processor 70 is used for receiving the object image data 37 from the integer divider 60, and transferring the data depending on the data specification by the rear element demand to output an input image data 39.

Figure 4:
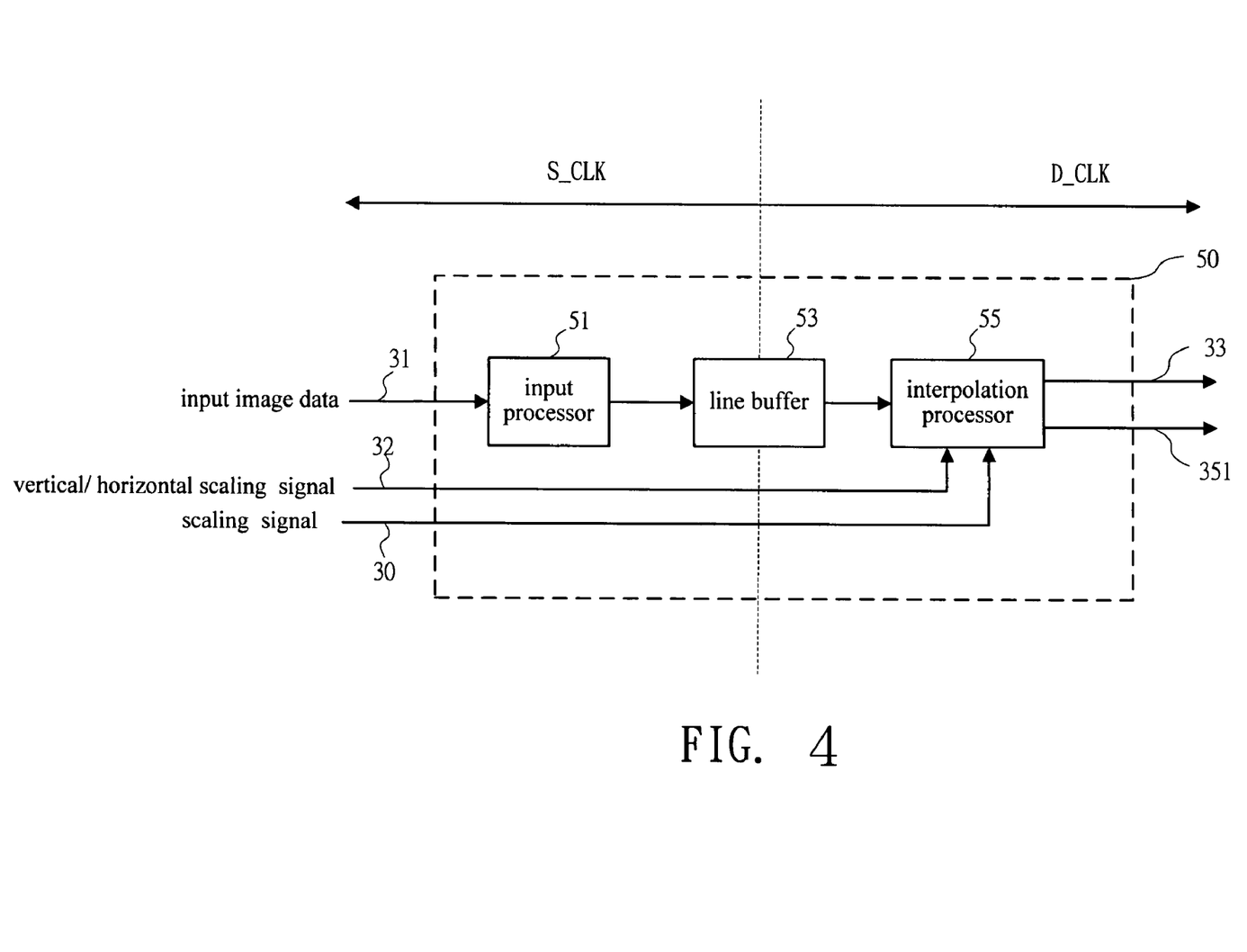
FIG. 4 is a block diagram of the image enlarging device of a preferred embodiment of the present invention.

FIG. 4 is a block diagram of the image enlarging device of a preferred embodiment of the present invention. The image enlarging device comprises an input processor 51, a line buffer 53, and an interpolation processor 55.

The input processor 51 is used for receiving the input image data 31, and the clock thereof is input clock S_CLK. The line buffer 53 is used for transferring the access frequency of the input image data 31, and the clock in the input end thereof is input clock S_CLK, as well as the clock in the output end thereof is output clock D_CLK. The clock S_CLK for inputting the input image data 31 synchronizes with the output clock D_CLK.

Interpolation processor 55 is used for interpolating the input image data 31 in vertical and horizontal directions depending on the scaling signal 30 with coordinating vertical/horizontal control signal 32 to generate the enlarging image data 33 and sample signal 351.

Figure 5:
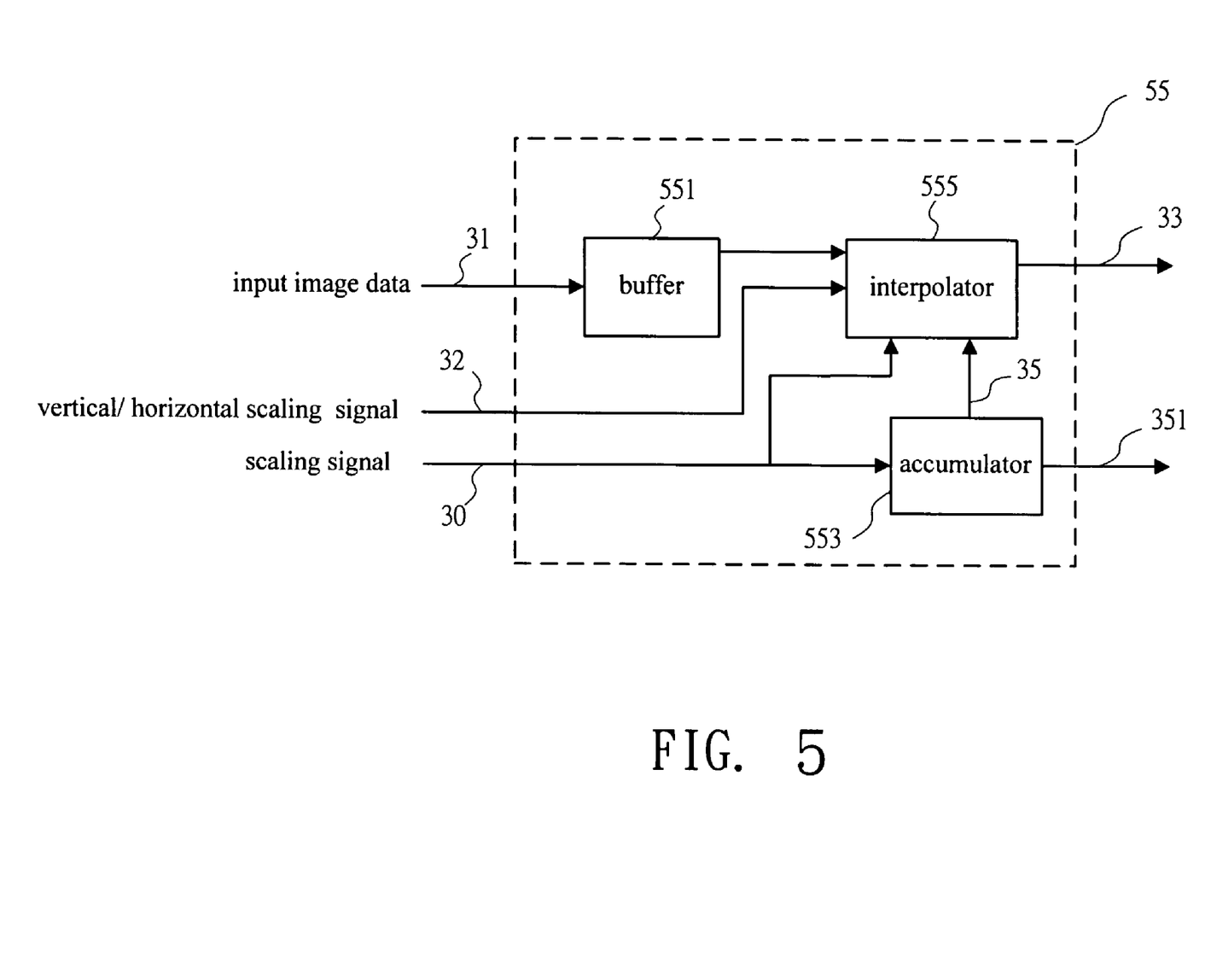
FIG. 5 is a block diagram of the interpolation processor of a preferred embodiment of the present invention.
Figure 6:
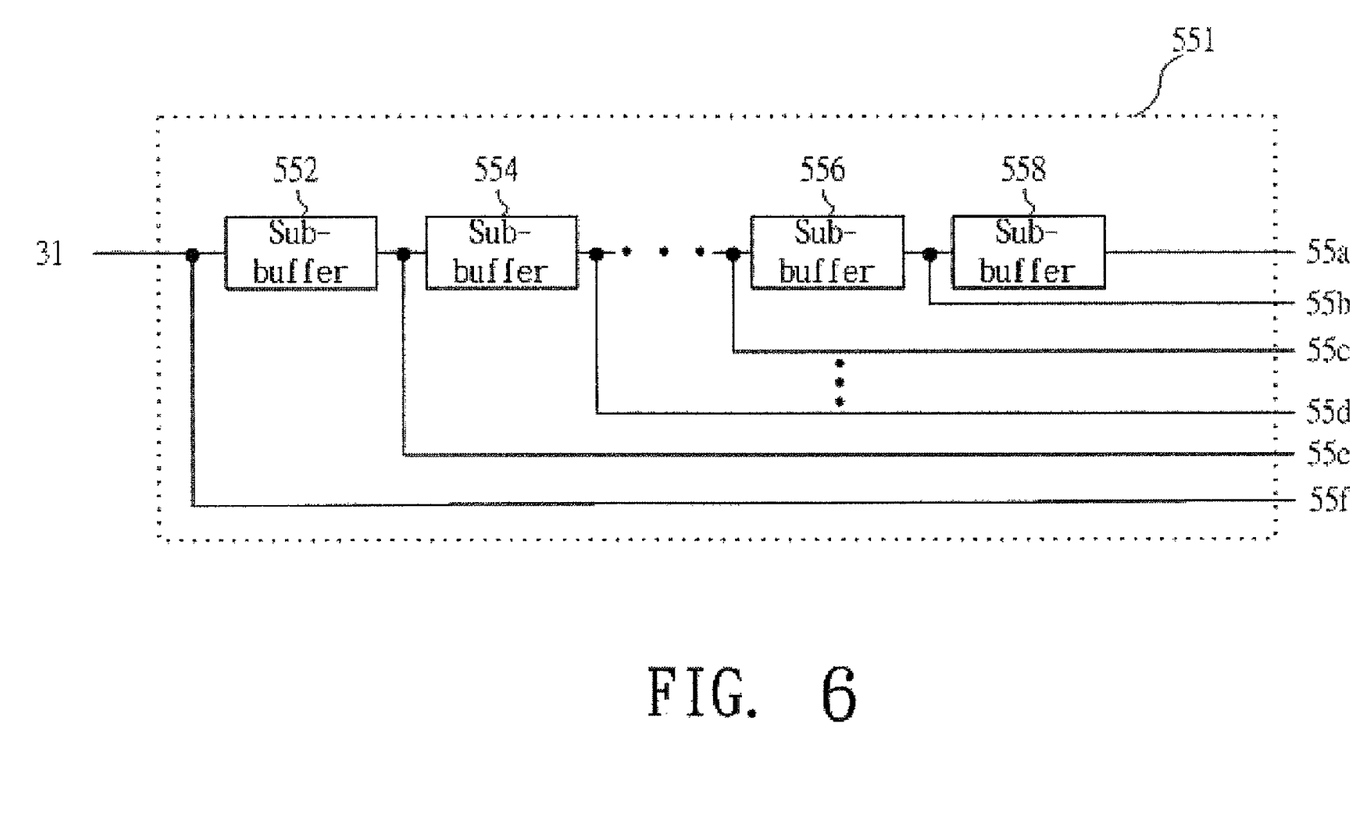
FIG. 6 is a block diagram of the buffer of a preferred embodiment of the present invention.

FIG. 5 and FIG. 6 are block diagrams of the interpolation processor and the buffer of a preferred embodiment of the present invention. The interpolation processor 55 comprises a buffer 551, an accumulator 553, and an interpolator 555.

The buffer 551 is used for receiving the input image data 31 transferred from the access frequency of the line buffer 53, and registering one of the pixel set data of the input image data 31. The clock is output clock S_CLK. The buffer 551 comprises a plurality of sub-buffers 552, 554, 556, and 558; wherein each sub-buffer (552, 554, 556, and 558) is only registered for one pixel data (55a, 55b, 55c, 55d, 55e, and 55f), and the number of sub-buffers depend on the demanded image quality by user.

The accumulator 553 is used for receiving the scaling signal 30, and for generating and outputting the power signal 35 and sample signal 351 according to the scaling signal 30 power signal 35 is an integral multiple of said scaling signal, which is larger than 1, and the smallest integer is preferred. The sample signal 351 comprises an enabling signal within each integral clock period for coordinating with the power signal 35.

Therefore, assuming the power signal is set as N, while the scaling signal 30 is an enlarging signal, such that as the scaling signal is larger than 1, the accumulator 553 does not accumulate, and the N of the power signal 35 is 1, and also outputs the power signal. On the contrary, while the scaling signal 30 is a reducing signal, such that the scaling signal is smaller than 1, the accumulator 553 does accumulate as N=N+1, until the scaling signal multiplying N is larger than 1. For example, While receiving the scaling signal is 0.4, the accumulator 553 is going to accumulate from N=1 to N=N+1;

While the N is 2, the scaling signal multiplying N is as 0.4×2=0.8, which is smaller than 1 still, and the accumulator 553 must continue to accumulate;

While the N is 3, the scaling signal multiplying N is as 0.4×3=1.2, which is larger than 1, and the accumulator 553 stops to accumulate, and outputting the power signal as N=3.

The interpolator 555 is used for receiving the pixel set data registered by the buffer 551, and interpolating the pixel set data in vertical and horizontal directions depending on the scaling signal 30, power signal 35, and vertical/horizontal control signal 32 to output enlarging image data 33. The clock is output clock D_CLK. And, the enlarging ratio is the multiple of the scaling signal 30 and power signal 35, such as assuming the scaling signal is 0.4, and the enlarging ratio is as 0.4×3=1.2.

Figure 7:
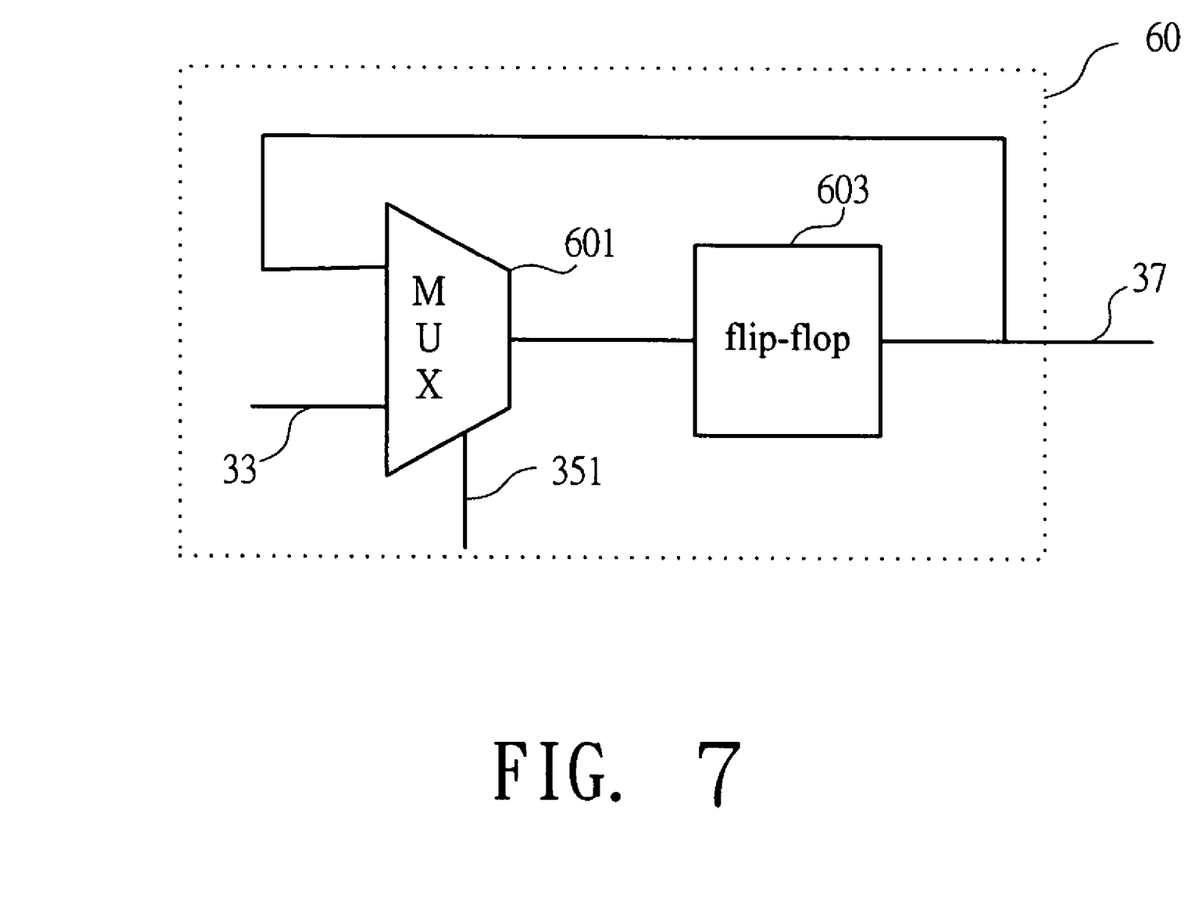
FIG. 7 is a block diagram of the integer divider of a preferred embodiment of the present invention.
Figure 8:
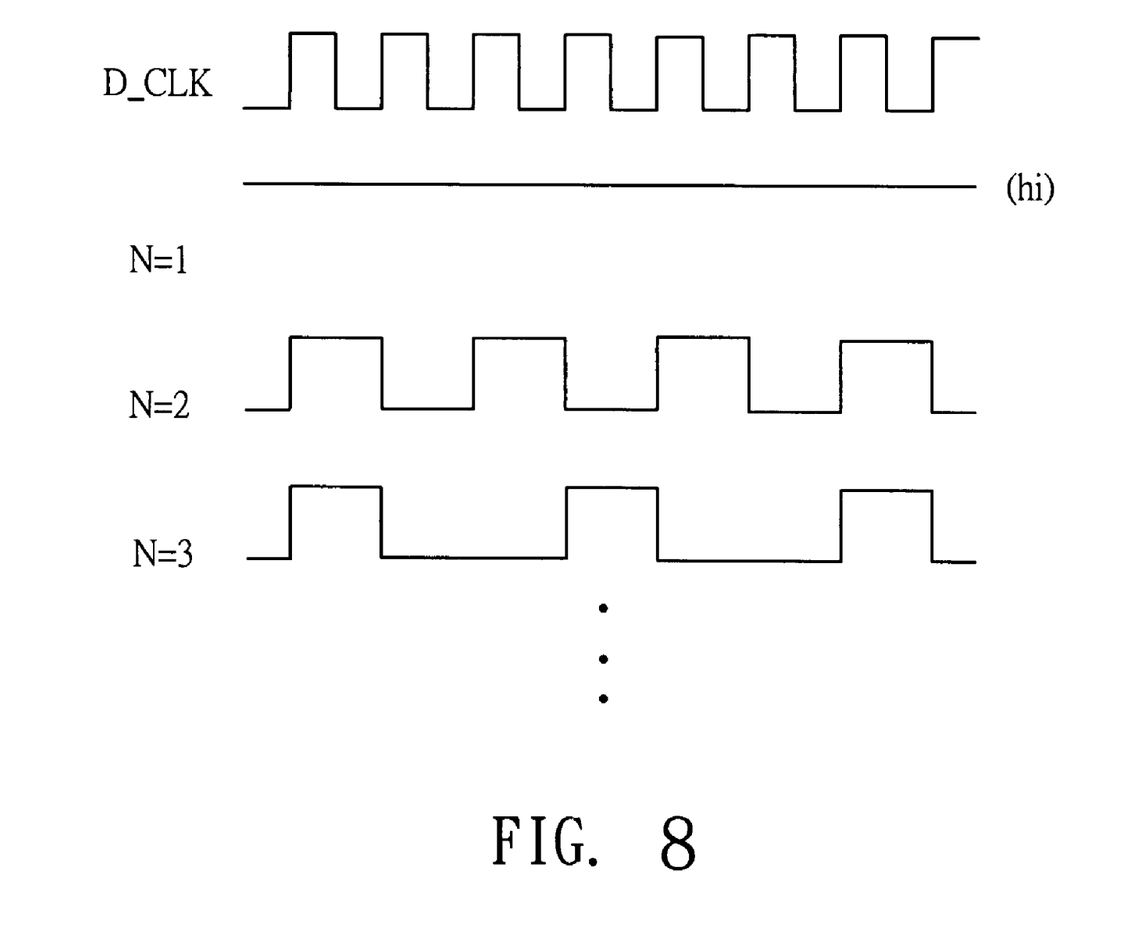
FIG. 8 is a wave form of the sample signal of a preferred embodiment of the present invention.

In FIG. 7 and FIG. 8 are shown a block diagram of the integer divider and a wave form of the sample signal of a preferred embodiment of the present invention. The integer divider 60 comprises a multiplexer 601 and a flip-flop 603, wherein the selection send of the multiplexer 601 connects to the accumulator 533 for receiving the sample signal 351, and the output end thereof connects to the flip-flop 603. The first input end of the multiplexer 601 connects to the output end of the flip-flop 603, and the second input thereof receives the enlarging image data 33 interpolated by the interpolation processor 55. Therefore, the enlarging image data 33 is sampled according to the sample signal 351.

The corresponding relationship by the sample signal 351 and the power signal (N) 35 is shown on FIG. 8. For example, While N is 1, as a scaling signal of enlarging, each clock period of the sample signal comprises an enabling signal, as a high potential signal. Further, when the enlarging image data 33 is passed through the integer divider 60, the multiplexer 601 is going to sample each point to pass through and output the whole enlarging image data 33;

While N is 2, as a scaling signal of reducing, the sample signal comprises an enabling signal within each of two clock periods. Therefore, when the enlarging image data 33 is passed through the integer divider 60, the multiplexer 601 is going to sample one data from each two data;

While N is 3, as a scaling signal of reducing, the sample signal comprises an enabling signal within each of three clock periods. Therefore, when the enlarging image data 33 is passed through the integer divider 60, the multiplexer 601 is going to sample one data from each three data.

As well, assuming the scaling signal is 0.4, the input image data 31 is enlarged to 1.2 power as an enlarging image data 33 by image enlarging device 50, and further sampling by the integer divider 60 according to the sampling signal of N=3 to obtain the object image data 37 with object size.

When the scaling signal 30 is a reducing signal within the scaling device of the present invention, enlarging image at first is able to increase the quantity of the same image data, and then when image is reduced, the integer divider 60 is going to sample the data quantity of the enlarging image and further increase the ratio of sampled data quantity to reduce the distortion rate of the image definition.

In summary, it is appreciated that the present invention is related to a scaling device of image process, only adding an external integer divider provided out of the image enlarging device to obtain a scaling function of an imageprocessor, to present a simpler circuit of image scaling.

The foregoing description is merely one embodiment of present invention and not considered as restrictive. All equivalent variations and modifications in process, method, feature, and spirit in accordance with the appended claims may be made without in any way from the scope of the invention.

I claim:

1. A scaling device for an image processor, comprising:

a image enlarging device for receiving an input image data and a scaling signal, and enlarging said input image data depending on said scaling signal to output an enlarging image data and a sample signal; and an integer divider connected to said image enlarging device for receiving said enlarging image data, and sampling said enlarging image data depending on said sample signal to output an object image data;

wherein said image enlarging device comprises:

an input processor for receiving said input image data;

a line buffer connected to said input processor for transferring said input image data at an access frequency; and an interpolation processor connected with said line buffer and said integer divider for interpolating said input image data, generating said enlarging image data and said sample signal;

wherein said interpolation processor comprises:

a buffer connected to said line buffer for receiving said input image data transferred at said access frequency of said line buffer from said line buffer, registering a pixel set data of said input image data;

an accumulator for receiving said scaling signal, generating and outputting said sample signal and a power signal according to said scaling signal; and an interpolator connected with said buffer, said accumulator, and said integer divider for receiving said pixel set data, interpolating said pixel set data depending on said scaling signal and said power signal to output said enlarging image data; and wherein said power signal is an integral multiple of said scaling signal and the enlarging power of said enlarging image data, wherein the product of said scaling signal and said power signal is larger than 1.

2. The scaling device of claim 1 further comprising a output processor connected to said integer divider for receiving said object image data sampled from said integer divider and outputting thereof.

3. The scaling device of claim 1, wherein when said scaling signal is larger than 1, said power signal is 1.

4. The scaling device of claim 1, wherein said power signal is a smallest integral multiple of said scaling signal, which is larger than 1.

5. The scaling device of claim 1, wherein said sample signal is that each integer period of clock comprises an enabling signal.

6. The scaling device of claim 1, wherein said buffer comprises a plurality of serial flip-flops for registering said pixel set data.

7. The scaling device of claim 1, wherein said integer divider comprises a multiplexer and a flip-flop, the selection end of said multiplexer receiving said sample signal, the output end thereof serially connected to the input end of said flip-flop, the first input end of said multiplexer serially connected to the output end of said flip-flop, the second input end of said multiplexer serially connected to said image enlarging device, and receiving said enlarging image data.

* * * * *